US005704189A

United States Patent [19]
Collier

[11] Patent Number: 5,704,189
[45] Date of Patent: *Jan. 6, 1998

[54] METHODS AND APPARATUS FOR INSTALLING CONDUCTOR CABLES IN RIGID BUILDING STRUCTURES

[76] Inventor: William R. Collier, 137 St. Pierre, Montreal, Quebec, Canada

[*] Notice: The term of this patent shall not extend beyond the expiration date of Pat. No. 5,463,838.

[21] Appl. No.: 554,748

[22] Filed: Nov. 7, 1995

Related U.S. Application Data

[63] Continuation of Ser. No. 149,317, Nov. 9, 1993, Pat. No. 5,463,838.

[51] Int. Cl.$^6$ ........................................ E04B 1/00
[52] U.S. Cl. .................. 52/741.1; 52/105; 283/67; 283/70
[58] Field of Search ................ 52/105, 741.1, 52/750; 283/67, 70

[56] References Cited

U.S. PATENT DOCUMENTS

| | | |
|---|---|---|
| 1,976,847 | 10/1934 | Gordon et al. |
| 2,805,471 | 9/1957 | Lowden |
| 3,061,663 | 10/1962 | Reiland |
| 3,083,307 | 3/1963 | Williams et al. |
| 3,197,554 | 7/1965 | Baker |
| 3,287,509 | 11/1966 | Bohnenblust |
| 3,474,559 | 10/1969 | Hunt |
| 3,902,026 | 8/1975 | Rogers et al. |
| 4,804,806 | 2/1989 | Orr, Jr. et al. |
| 4,880,484 | 11/1989 | Obermeier et al. |
| 4,901,004 | 2/1990 | King |
| 4,916,444 | 4/1990 | King |
| 4,953,194 | 8/1990 | Hansen et al. |
| 4,997,994 | 3/1991 | Andrews et al. |
| 5,017,415 | 5/1991 | Cosman et al. |
| 5,021,968 | 6/1991 | Ferketic |
| 5,107,532 | 4/1992 | Hansen et al. |
| 5,116,654 | 5/1992 | Cosman et al. |
| 5,127,062 | 6/1992 | Cerda |
| 5,142,105 | 8/1992 | Kihlken et al. |
| 5,243,655 | 9/1993 | Wang |
| 5,296,850 | 3/1994 | King |
| 5,298,731 | 3/1994 | Ett |
| 5,329,464 | 7/1994 | Sumic et al. |
| 5,463,838 | 11/1995 | Collier ........................ 52/741.1 |

*Primary Examiner*—Carl D. Friedman
*Assistant Examiner*—Creighton Smith
*Attorney, Agent, or Firm*—James T. FitzGibbon

[57] ABSTRACT

A method of identifying and installing a plurality of electrical or other signal carriers, pipes, tubes or the like within a building structure. The method includes the steps of determining the paths along which the various carriers are to be laid out within the structure, formulating a retrievable record of such paths, storing and retaining the retrievable record of such location information in an accessible computer memory or the like, and assigning a unique identifying expression to each of the carriers. The unique identifying expression is reproduced on spaced apart portions of each of the carriers, and the carriers are then installed according to plan. By using the unique identifying expression to access the computer memory, the location of all points along each carrier can be determined.

17 Claims, 3 Drawing Sheets

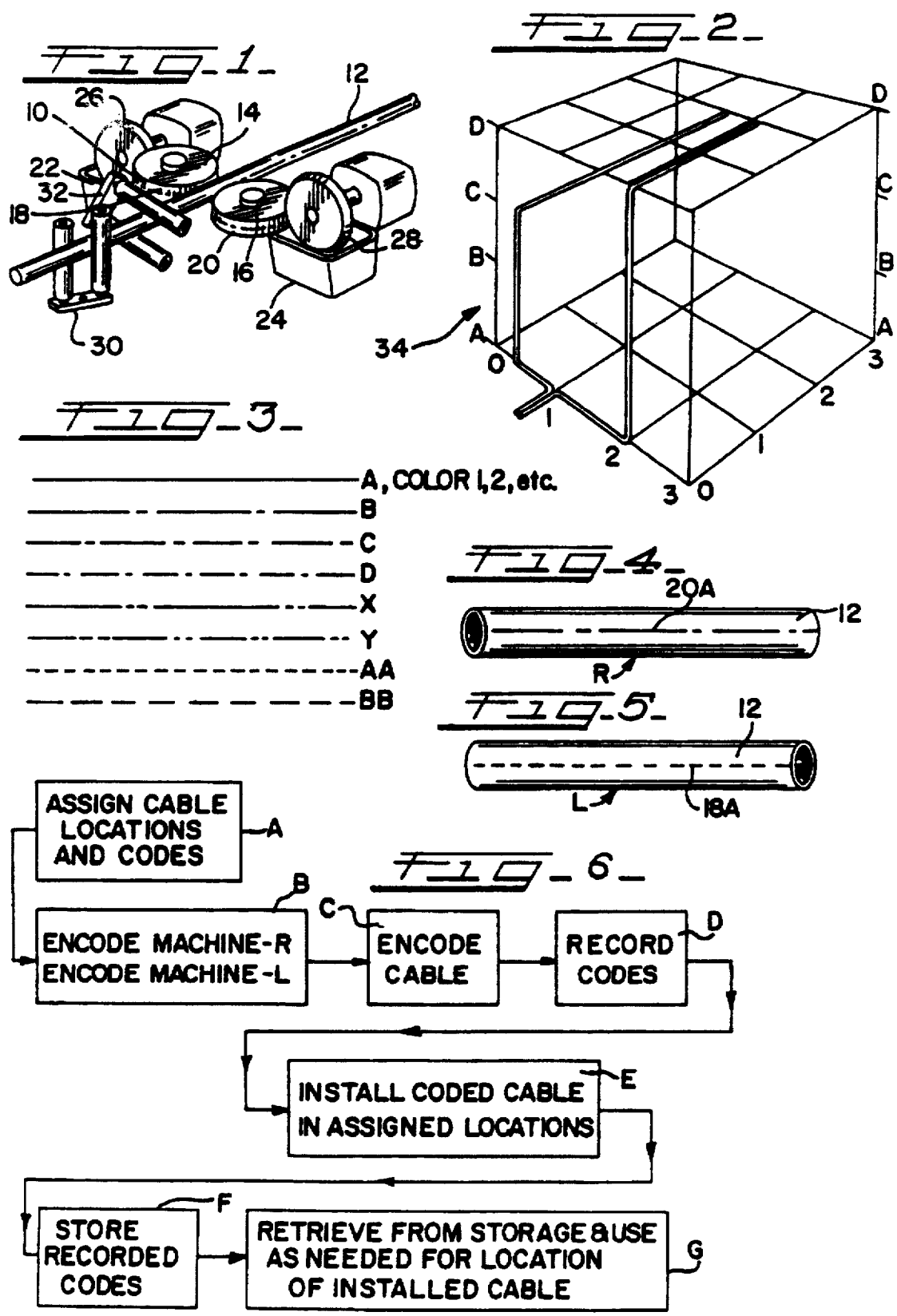

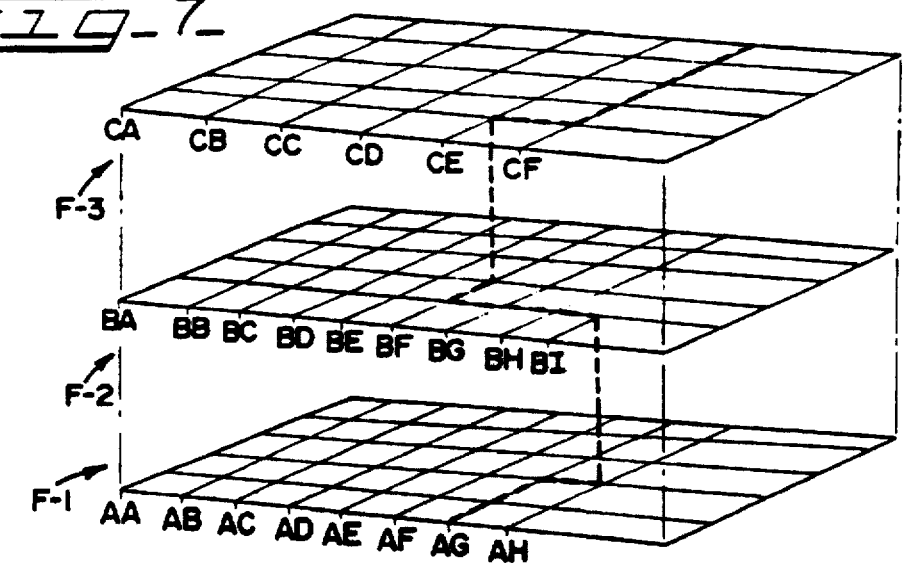
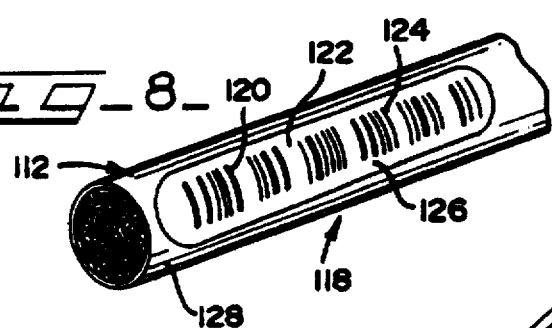
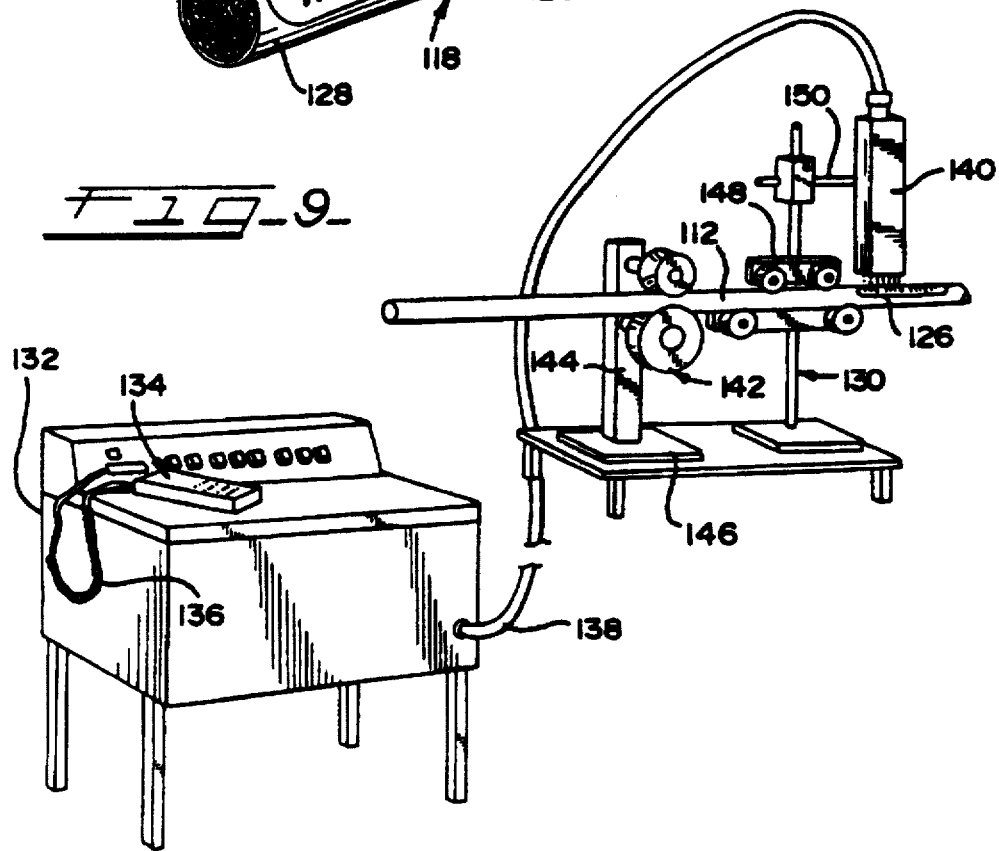

METHODS AND APPARATUS FOR INSTALLING CONDUCTOR CABLES IN RIGID BUILDING STRUCTURES

This application is a continuation of application Ser. No. 08/149,317, filed on Nov. 9, 1993, now U.S. Pat. No. 5,463,838, issued Nov. 7, 1995.

BACKGROUND OF THE INVENTION

The present invention relates generally to methods and apparatus for construction and manufacturing, and more particularly, to a unique system for characterizing carrier elements disposed in rigid structures so that these carrier elements can be identified and distinguished from one another, and so that the individual characteristics and/or location of any one or more carrier elements may be preassigned, classified, and/or stored for retrieval according to a preset plan.

According to the invention, the carrier elements may be signal carriers such as electrical wires, fiber optic cables, tubes or hoses for vacuum or air pressure signals, power carriers such as electrical conductors or fluid power lines, or other carriers or conductors such as pipes, tubes, or hoses for water, liquid samples, refrigerant, or fuel, for example.

The characterization system of the invention permits what are herein termed "carriers" to be uniquely identified by means of a code based on a system that implicitly or otherwise individualizes each carrier and a location/function code describing the characteristics and location of such carrier, such as its origin, its destination, the pathway it follows within the structure, and its function. These codes can be imprinted on or associated with the carrier, wholly or in part, and part or all of the code can be placed in memory for subsequent use when it is desired to identify the particular coded carrier for some purpose, such as repair or replacement.

The system preferably includes maintaining an array of codes uniquely identifying each carrier and a location record identifying the characteristic path followed by the carrier within the structure so that the carrier may, after installation, be readily found within the structure, and when the carrier is found, be identified as being associated with certain equipment. Other points along the path the carrier follows within the structure can also be determined immediately.

In a preferred form, the cable, wire or other cable is encoded by a bar-code or other optically machine readable ("OMR") code that coordinates with information such as a location record applicable to the carrier. In one embodiment, the invention enables computer-aided design and computer-aided manufacturing ("CAD/CAM") techniques to be used in laying out an intended path for all the carriers to be emplaced within a building structure. After layout, a given length of the carrier is dedicated to a certain application, the carrier is cut to length, and connectors are affixed to it. The carrier is then encoded with information sufficient to identify it and its intended path within the building, and the carrier is shipped to the proposed installation. At this time, the carrier may be installed according to the location plan embodied or described in the code established by the computer or computer operator. Thereafter, it may be found when needed for maintenance or replacement. In the alternative, once found, the carrier may be positively identified and its attributes determined by reference to the original installation plan.

According to present building construction practices, and referring to telephone cables by way of first example, it is customary to lay or "string" so-called "gray" cables throughout a building, using such cables to connect telephone to a master telephone terminal within the building. Thus, a telephone company provides a telephone terminal within a building and, within that same building, many of these sheathed telephone cables extend out to the various rooms or offices within the building. In actuality, so-called "gray" cables may not only be sheathed in a gray material, but also commonly in black, white, blue, orange, or translucent coating sheaths.

Each "gray" cable typically comprises a sheathed or encased array having fifty (50) individual conductors arranged into twenty-five (25) pairs, such cable being known customarily as a "25 pair cable." While 25 pair cables is common, cables may have as many as 900 or more pairs, also called "twisted pairs," of conductors. Each one or more pairs of conductors services one instrument terminal, or a plurality of terminals on a telephone, and each cable serves a particular instrument within a room. The individual pairs of conductors within the cable are themselves color coded so as to indicate the terminal or phone number they service.

Although each of these individual pairs of conductors is color and pattern coded so that one is able to identify the respective near and far ends of such pair in any given installation, insofar as it has been able to be determined, there has up until now been no way to determine the location of the other parts of the so-called "gray" cable within the building itself. In other words, in a typical installation, cables having exterior sheaths covering the conductor pairs and extending from the telephone company equipment in the various rooms and suites, or otherwise within the building, are simply not individually marked so as to be distinguishable as among themselves. These cable are customarily disposed in conduits dedicated to telephone cables, but in many other cases, are trained between walls, in troughs, along studs, through conduits, in other wireways, in false ceilings, or otherwise within the building.

Further, according to present day practice, when an installation is altered, or a new installation is made, it is customary to leave the existing "gray" cable in place within the building structure, either because no record of the pathway or location of the "gray" cable has been made, or for other reasons. In other words, quite surprisingly, when an installation is made, cable is strung or attached individually for a known application, and while the whereabouts of both cable ends thereof are necessarily known, the routing of the cable itself is done arbitrarily as job conditions indicate, and the exact location of the cable's entire intermediate length is not recorded, and hence is often simply not known after the cable has been installed and the worker have left the scene of the installation.

Consequently, when wires or cables providing telephone service are to be removed or altered, no effort is made to open up the cable conduit system or the like and remove the old cable, because, beyond the immediate end areas, there is simply no way to distinguish one "gray" cable from another. Unused cable cannot then be found and retrieved and/or salvaged for reuse or otherwise. Such unused cable is customarily simply abandoned in place within the building.

As the size and complexity of the building or other structure involved becomes greater, proper use of dedicated cable space as well as minimizing the waste of otherwise useful cable increase in importance. Frequently, there are so many cables in older buildings that space of considerable value is lost without recourse.

To a greater or lesser extent, the typical practices illustrated above are applied generally to most kinds of electrical and optical conductors, and also to computer cables and other wiring of various kinds. These present practices are also followed elsewhere in building construction, such as with thermostat or other control wire or tube applications, and with fiber optic bundles used with computers, for telephones or in other applications. Such practices may also be adopted for future communication or power carrier systems that are not yet fully developed. Hereinafter, therefore, the expressions "carrier" or "carrier element" will often be used to designate generically not only electrical power carriers, but also power or signal carriers of all kinds, i.e., electrical, hydraulic, pneumatic, vacuum, fiber and other optical, acoustic, fluidic, and other carriers generally.

The present invention can be used in numerous applications in a wide range of building structures, such as a large residential unit, a hospital, a shopping mall, a factory, a school, or an office. Other structures for which this invention is suitable include airplanes, automobiles, or other complex rigid structures utilizing various electrical, optical, or other carriers or conductors following a plurality of sometimes arbitrary pathways.

The present invention provides a number of simple methods for identifying and recording the pathways of carriers installed within a building or other structure. According to a presently preferred form of the invention, the structure in question is subdivided into a grid or other pattern defining a matrix or series of identifiable spatial coordinates. For each carrier or bundle of carriers, such as a cable, a path defined by an origin, a destination and, in practice, at least one (and usually many) intermediate "way point(s)", is selected. A record of those location points is then made. Thereafter, a characteristic location list or code indicative of the particular origin, destination, and way point(s), if any, applicable to that carrier element is thus developed.

The code is expressed in a simply shorthand form, such as in bar code or alpha-numeric form, and imprinted at spaced apart points on the carrier element exterior. Then the cable is installed according to the location point plan contained in the record. At any time thereafter, therefore, when access is had to the exterior of the cable or carrier element, the code can be readily found. This establishes the identity of the carrier, and the location record will provide the information needed to perform maintenance, repair, or replacement. Preferably, the location record is embodied in a memory accessible to the bar-code reader so the reader can provide location information in humanly readable form. With the advent of low price, reliable, portable, and simple-to-use computers and/or bar-code readers, for example, the problem of developing, storing, and retrieving complex location codes is solved in part by the preferred practice of having a computer generate and retain a record of all of the characteristic location information applicable to each of the carriers within the building, and a code that correlates the record to the carrier element. These are stored for access through the code so that knowing the carrier's identity enables its location to be disclosed and vice versa.

In those instances wherein the carrier is encoded at a location remote from the point of installation, there may be intermediate storage of the location record of cable coding information. For instance, after a building plan is completed and the intended location of the cable is determined and recorded, a cable may be coded, cut to length and connectors added, all at a location remote from the building. Thereafter, when the cable is delivered to the structure, access is had to retrievable memory containing the location record and code information, such as the memory of a computer or like device, for example. This location record information is then used in performing the installation. Thereafter, the location information remains in, or is placed or replaced in, the memory to simplify subsequent efforts to find the cable when that is deemed necessary for repair, replacement, maintenance, or otherwise.

In the preferred form of the invention, known forms of codes are used, particularly bar-codes and alpha-numeric codes. Other forms of codes, such as codes comprised of arbitrary, reproducible arrangements of colored solid or interrupted lines, or other machine readable codes, may also be used. In addition, invisible code carriers such as electromagnetic tapes or other non-optically readable code carriers may be used.

While any given encoded term, in order to be useful, must include terms sufficient to distinguish it from all other terms of the same codes, as has been pointed out and as will appear further, any given code need not necessarily contain a separate carrier identity term. Such an identity term would be necessary if two or more cables had exactly the same location at all points throughout their path, for example. Implicitly, therefore, any one code may be thought of as having two different functions, i.e., an identifying function and location record function. At the conceptually simplest level, the code may be considered a single code having both location and identity-disclosing functions. Thus, a separate identity code term is not necessary if no two location codes are the same; the identity code is thus implicit in the location code. As long as each code is uniquely identified with one individual carrier, then the identity function is present and a proper use of the invention can be made. Of course, the code may, but need not, contain information about every location point. In such cases, the carrier is uniquely identified, but as much information about it as is desired is contained in a remote memory of any desired degree of complexity or capacity. As long as the code permits unique reference to a unique carrier, and the location record applicable to it can be found, the code is useful.

In view of the failure of the prior art to provide useful, unique cable coding, installation, memory and retrieval apparatus and methods, it is an object of the invention to provide improved carrier installation methods and apparatus for use in buildings or other structures.

Another object of the invention is to provide an improved building method which includes laying out a plurality of paths to be followed by various carriers within a grid formed by the structural or other components of a building or other rigid structure, associating each proposed carrier path with a characteristic location record for such carrier, preparing a record of an array of such proposed locations, accessibly encoding each carrier with a characteristic code referable to such record, installing each carrier in its assigned location, and retaining the plan and the record for subsequent association with the code to permit retrieval for maintenance, modification, or removal at a subsequent time.

Another object of the invention is to provide a cable or like carrier encoding, recording, and decoding system that is simple to use and compatible with existing encoding and reading equipment.

A further object of the invention is to provide a system that includes a method of record keeping for the locations of various carrier elements disposed within a building or other rigid structure.

A still further object of the invention is to provide a carrier installation and maintenance method that may be readily accomplished using a computer generated, characteristic bar-code to identify the characteristics of sheathed cables or other conductors or carriers.

Yet another object of the invention is to provide a carrier encoding and installation system that uses known equipment, modified or unmodified, in a novel, simple and affordable application of bar-coding.

A still further object of the invention is to provide a carrier encoding, recording, and decoding system wherein a carrier contains a visible, contrasting field serving as an optical background for an imprinted, visible code indicative of the identity of the carrier and providing a record of all parts of its location, or indicating where access to such location information or records may be found.

Yet another object of the invention is to allow for the ready storage of other such data regarding a carrier, such as its length, functional type, type of "connectorization," its diameter, age and the frequency with which a particular carrier may have been repaired or one or more of its characteristics altered.

Another object of the invention is to provide a method wherein a location plan for carriers or similar traceable elements may be made during or prior to erection of a building or other structure, wherein the pathways of the various identifiable cables or the like may be developed and a record of the pathways may be placed in a retrievable memory, wherein a code referable to the location record may be prepared and reproduced at intervals along the length of various uniquely identified carriers to identify them uniquely according to their locations, and wherein the carriers may be cut to length and forwarded to the building location for installation according to the plan, aided by reference to the information contained in the record or memory of the location plan.

The foregoing and other objects and advantages of the invention are achieved in practice by providing a method of installing a plurality of carrier elements within a building structure, which method includes the steps of determining the intended locations of various carriers within the structure, formulating a record of such locations, assigning to each carrier a location code indicative of the record of the location points comprising its intended path within the structure, storing and retaining the record of the location information in an accessible memory means, such as in a written record or in the memory of a computer, reproducing at least portions of the codes on portions of each of the carrier elements, and installing each carrier element in the structure such that each carrier element follows its intended path, whereby each carrier element bears a unique code referable to a record disclosing its location path within the structure and so that access may be had to the carrier element at some or all points along its length, and so that the identity of any one carrier element may be determined by reference to the code. In those cases wherein the record of location points does not uniquely identify the carrier element, a separate identifying code element may be used.

The manner in which the foregoing and other objects and advantages of the invention, including its inherent objects and advantages, are achieved in practice will become more clearly apparent when reference is made to the accompanying detailed description of the preferred embodiments of the invention set forth by way of example and shown in the accompanying drawings, wherein like reference numbers indicate corresponding parts throughout.

BRIEF DESCRIPTION OF THE DRAWINGS

FIG. 1 is a perspective view, partly diagrammatic in nature, of a carrier encoding device that may be used in the practice of the present invention;

FIG. 2 is a perspective view, schematic in nature, showing one method of making a building plan carrier location layout, illustrating the manner in which a location code is arbitrarily assigned to portions of a building space;

FIG. 3 is a table showing a simplified form of code system using patterns, colors, or other means of identifying a given carrier;

FIG. 4 is a side elevational view of one side of a specimen imprinted with a unique carrier identity code;

FIG. 5 is a view similar to that of FIG. 4, showing the other side of the same carrier;

FIG. 6 is a block diagram showing certain steps employed in carrying out one form of the invention;

FIG. 7 is a diagrammatic view of a building showing a carrier extending along a predetermined path extending from a coded point of origin through a series of coded way points, and to a coded destination;

FIG. 8 is a perspective view of one form of carrier, showing one side of the carrier having a characteristic visible bar code on a field providing optical contrast with respect to the elements of the code;

FIG. 9 is a perspective, partially diagrammatic view showing a presently preferred form of encoder for the cable;

DESCRIPTION OF THE PREFERRED EMBODIMENTS OF THE INVENTION

Figure 10:
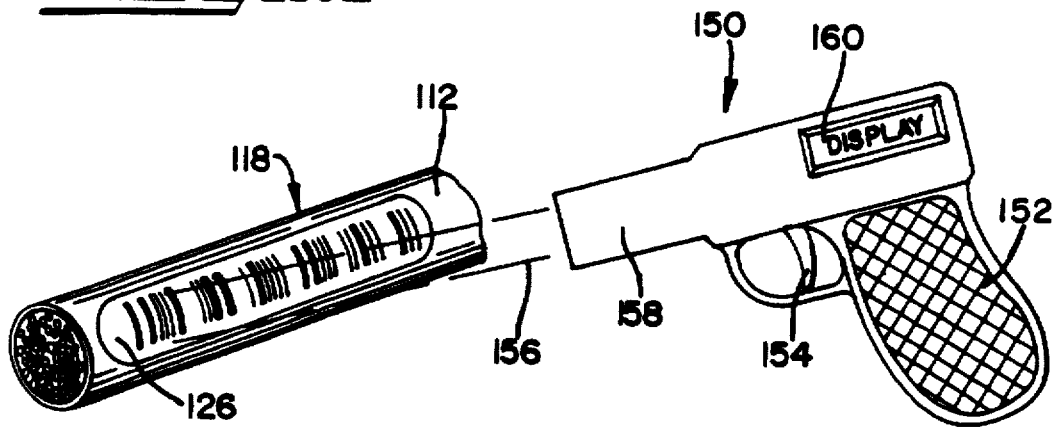
FIG. 10 is a perspective view, partly diagrammatic in nature, showing the use of a hand-held combination bar code reader and memory "gun" used in practicing the invention.

While the invention is capable of being practiced in various ways, and while the form of encoding equipment, the codes used, the type of carrier encoded, the type of structure in which the cable or other carrier is installed, and the coding, installation, and other steps, are not confined to a particular order or location, and are not the only ways of practicing the invention, a detailed description thereof will be made in relation to coding and installing telephone or electrical cables used in a conventional building structure. In this connection, the expression "carrier", as used herein and in the claims, is intended to be used generically, and as pointed out above, is intended to encompass single or multiple electrical, optical, hydraulic, vacuum, pressure, fluidic or other carriers of any kind, and is not intended to be limited to any particular form of carrier or conductor.

Referring now to FIGS. 1-4, a general illustrative example of a very simple manner of carrying the principles of the invention into practice will be described. First, it will be assumed that a marking machine of the type shown in FIG. 1 has been selected and that a particular code is intended to be applied to a carrier in the form of an electrical cable 12.

FIG. 1 illustrates a simplified form of such coding machine generally designated 10, and shown to be encoding a length of cable 12 passing between code impression rollers, 14, 16, each of which contains a characteristic raised encoding die pattern 18, 20. As shown, pattern 18 on roller 14 is a series of closely spaced apart, short dashes of equal length. The impression die pattern 20 on roller 16 is an alternating series of one short and one long dash. The machine 10 also includes ink supply trays 22, 24 associated respectively with offset inking rollers 26, 28 associated respectively with the impression rollers 14, 16.

As is shown, the coding machine may include other elements such as a bifurcated set of pivotal guide roller sets 30, 32 serving to maintain horizontal and vertical alignment between the cable piece 12 and the impression rollers 14, 16. The construction and operation of the frame elements, the drive elements, and the like being known per se, such construction is not believed necessary to an understanding of the invention and is therefore not shown herein in detail. It will be understood that the code impression rollers 14, 16 are readily changeable, as are the inking trays 22, 24, so that, as referred to elsewhere herein, any desired code may be imprinted on a length of cable without difficulty, it being only required that an appropriate selection of impression rollers and ink colors be available for employing this type of marking system. The cable or pattern may be pre-printed or otherwise furnished with a solid background providing contrasting color for increased readability, if desired. Likewise, the code may be imprinted on labels that can be affixed to the cable after printing.

FIG. 3 shows that, for example, any arbitrary code, consisting, for example, of any one combination and/or number of dots, dashes, or solid line patterns may be selected for imprinting on one side of the carrier and that the same or different characteristic code may be imprinted on the other side of the carrier. Furthering the example previously referred to, the code appearing on the right hand side of a cable as shown in FIG. 4 would be a code corresponding to code "B" of FIG. 3; the code appearing on the left side would correspond to the code "AA". FIG. 3 shows that each of these coded formations may likewise be selected from an available array of colors so that, given the number of permutations and combinations available, any given cable 12 or like carrier may bear a code selected from an extremely high number of available code term combinations.

Assuming now that a cable or other carrier has been coded as just described, then such carrier is next prepared for and installed along a predetermined intended path of that cable within a structure schematically shown as 34 in FIG. 2. The path of this cable starts from a given point of origin having coordinates "0–1" on level "A" and travels first horizontally and then vertically as may be indicated by the needs of the structure. It is assumed that the point of origin, the point of destination, and the way points of that particular cable or carrier have been memorialized in a record that reflects these location points as unique spatial coordinates in or forming a part of an arbitrary grid describing the space schematically represented in FIG. 2. Here, what is considered the floor. level "A" is shown to have a plurality of front-to-back or longitudinal grid lines 0, 1, 2, 3, etc. and a plurality of side-to-side or transverse grid lines 0, 1, 2, 3, etc. A distinguishing location term may apply to each different floor or other vertically separated level as may be indicated, such as level A, B, C, etc.

Thus, a cable 12 may have an origin at coordinates A-0-1, and proceed by a path identified by subsequent coordinates to a destination point identified by a set of characteristic coordinates, in this case D-2-2. The respective sets of way points illustrated are A-2-0, B-2-0, C-2-0, C-1-0, D-1-0, and destination point D-2-2 by way of point D-1-2.

In keeping with the invention, an entry may be made in the memory of a computer or other means for receiving and retaining this characteristic location information, according to the plan of the builder. As long as the particular location record defines, designates, or is associated with a unique cable, then access may be had through a proper record or memory to a list of all of those locations at which parts of this carrier are located, i.e., the entire carrier path, merely by reference to the location code and thence to the location record. Furthermore, if the location record appears in code form in its entirety on the carrier, access to any reasonable length of the carrier's outer surface will itself reveal the carrier path. In the alternative, the location record identified by the unique code applicable to a particular carrier is consulted.

In one form of the invention, the entire code, i.e., the terms showing the destination, origin, and all way points of the carrier in question, may be imprinted on the carrier. Still further, the code may disclose the type of carrier, its age, i.e., date of installation, its length, its "connectorization", i.e., the style of connector affixed to the ends, etc.

While all location information (rather than merely part of it) may be imprinted on the carrier, this method may have one incidental disadvantage not present where the code only references the entire location plan record. In this scheme, it is more difficult to revise the carrier location without the possibility of error. In other words, if the code placed on the carrier reveals all location points, and the location of the carrier is altered, an entirely new set of code terms must be substituted on the carrier. However, if the carrier bears only the identity of the corresponding location record, when the location record is changed, the code on the cable exterior need not be changed. Hence, it is preferred in some instances to confine the code appearing on the cable exterior to what amount to an identity or access code, supplemented if desired by additional aspects of the code, if any, that are unlikely to be changed after installation. These include types of cable and equipment served, for example. In this example the code is referable to the location record, but the code information does not per se contain all the location information.

In the use of the invention, for example, assume that after a given installation has been made according to plan, subsequent work on the building requires cutting or rerouting a carrier. The exact carrier on which such rerouting must be accomplished is positively and uniquely identified by reference to the carrier element code itself. This leads to the memory or record containing the carrier location information. Because the exact pathway of the carrier is known, the carrier may be found easily, and its unique set of coordinates serves an identity function and may be used to select it from among a group of otherwise identical carriers in the same location. The carrier in question may then be rerouted, cut, spliced into, or removed from service as indicated, and the location record noted.

Using another example, if there is an equipment failure traceable to an incomplete circuit, tests may be performed at various points along the often tortuous path of a carrier element to isolate the section wherein the connection is broken. In this manner, a local break in a carrier of great length does not occasion abandonment of an existing carrier and replacement thereof with an entirely new carrier; various points along the carrier may be found readily by reference to its location record.

If demolition or destruction of a part of a building is indicated, a comparison may be made between existing carriers and the instruments that they service so that the importance or desirability of retaining existing carriers may be evaluated.

In a still further case, it may be desired to move the location of an instrument or splice into an existing carrier, and the system of the invention enables the identity of a carrier and its location within the building to be determined, after which access to the carrier may be had for repair or splicing purposes, for example.

Referring now to FIG. 6, a block diagram generally representing one form of the method of practicing the invention is shown. Here, in a block generally designated A, a plan is determined, for example, relating to the placement of different computers, telephones, or the like within the building. Depending upon the initial plan, that is, which computers, telephones, or like instruments are intended to communicate with each other, or be powered by the same or different sources, the intended paths for all carriers are uniquely determined and assigned. All origin, destination, and way points needed to identify the desired path for each carrier are determined, and a location record indicative of all these points is developed. A computer may be employed for the purpose of generating part or all of such points. Thereafter, a code is developed that expresses or gives access to the location record. At this point, the individual carrier intended to follow this particular path is normally identified implicitly by the terms of the location code. As printed out, a separate identity term may be assigned and used if needed.

Referring to block B, the next step is to encode a machine capable of reproducing at least some of the code on the carrier. Here, the type of machine shown in FIG. 1 is used as an illustration; a particular code is selected for the right and left hand sides respectively of a carrier and the machine is arranged in such a way that a desired mark will be permanently, legibly associated with the carrier. In this sense, whether the mark is actually imprinted, as by using ink, labeling, physical deformation, magnetic means, or otherwise, is relatively unimportant, it being required only that some positive, retentive, physical association be made between the carrier and the particular code markings selected. Other methods of marking a carrier element are addressed in detail elsewhere herein.

Assuming that the machine has been encoded as called for in block B, the next step is to transfer the code to carrier (block C), as by passing it through one of the printing machines referred to herein, or other machine capable of carrying out the encoding step of associating the code with the carrier.

Block D is intended to illustrate that the codes thus imprinted, as well as any location code terms not already transferred to the carrier, can be recorded in some recoverable form. This may be in the form of a manual recording in the simplest case, to retention in a computer program in more complex cases. All that is required is that there be a definite correlation between the code, or part of the code, appearing on the carrier element and the location plan or record applicable to the carrier in question, for subsequent reference.

Block E shows the next step in the preferred method, the step of physically installing the coded carrier in the assigned locations. This may include cutting a precoded carrier at selected points or it may, in the form of the method illustrated in FIG. 1, simply include installing a carrier that is coded at the building location. As described below, in many cases it is desirable to encode and cut the carrier to length at a remote location, perhaps also installing connectors at such location.

Referring now to the block designated F in FIG. 6, another step in the method is to store the location plan in memory means accessible through use of the code. Depending on the implementation, this may already have been done at step "D" if a computer or like system were used. If not, plan storage occurs next. As just suggested, immediate access to the stored plan may be required if the carriers have been pre-encoded and thus the intended locations are unknown to the persons making the installation. If the intended location plan is stored at the point where the carrier is manufactured and cut to length, access to such location plan will be required when the carriers are delivered to the building location for installation.

Block G shows the final step which, as pointed out, may occur one or more times as indicated by the circumstances. This block shows that once the coded location information is retrieved from storage, it may be used to locate all or selected parts of an already installed carrier. This step is also intended to include retrieving the location or other information from storage and using it where necessary to perform the initial or any subsequent installation, as well as recovery of the carrier after installation.

In some cases, the retrieval cycle may start when a part of a carrier element is physically located and its identity determined, and the need develops to find the remainder of its travel path. In other cases, the search may start with reference to the array of location records because it will have been established that a certain number of carriers is being sought. If the codes are simple and the number of carriers small enough, or if the coding equipment is sufficiently sophisticated, and subject to the considerations expressed above, the carrier may already possess all the location information, as well as an implicit identity term. Retrieval from storage of the points in the location record then simply involves decoding the terms on the cable.

Referring now to a relatively more sophisticated form of installation, and again, bearing in mind that a simplified form of building structure is shown, FIG. 7 illustrate what might be considered a series of three, vertically spaced apart floors, generally designated A, B and C, for example.

As shown in FIG. 7, floor A has an arbitrary coordinate code that includes a series of longitudinally extending lines designated respectively A, B, C, D, E, etc. and a number of transverse lines 1, 2, 3, 4, 5, etc. In such a code, a unique coordinate point has a flow level term, a longitudinal term and a transverse term. Thus, all the points on level A begin with an A, followed by the coordinates on that level, e.g. A-F-2; A-6-3, etc. The initial letter "A" designates floor A and that the second "A" designates the first longitudinal line.

Floors B and C are similarly laid out, differing in that the floor code will start with "B"; and, for floor C, the code letter will be "C".

Referring now to FIG. 7, there is also shown in broken lines the path of a cable generally designated 112. This cable 112 is shown to start at what may be considered an origin point 109 having coordinates A/D/1. These coordinates define or fix a particular point of origin for the cable in question. As shown, the cable proceeds longitudinally to a way point that would be identified as A/D/2. Here, the cable turns and proceeds until it reaches a point A/G/2. It then moves transversely to point A/G/3, then turning again to point A/H/3. Next, the cable 112 moves vertically to location B/H/3. Its next turn is at location B/F/3. Here, another vertical movement is made and the cable 112 follows the tortuous path by way of points C/F/3 to C/F/2 and finally arrives at destination point 113 having coordinate points C/F/6.

According to the invention, it is predetermined that this particular cable 112 is intended to follow this particular path. The cable 112 is then given a bar code that will uniquely identify it as the carrier intended to connect two (or more)

particular pieces of equipment. It is implicit that this cable or other carrier will follow its predetermined, intended layout, and that a record of that path will be made. The code may also contain indicia of the origin, all the way points and the destination. The bar code may thus also include the location code. Of course, the location record will normally be separately preserved so access to it may be had without the need for physically finding a specimen of the cable having the entire location point record forming a part of it.

Referring to FIG. 8, there is illustrated a bar-coded cable generally designated 112 and shown to contain a bar code generally designated 118, such code consisting of at least one (but preferably many) wide bars 120, at least one (but preferably many) spaces 122 and at least one (but preferably many) narrow bars 124, all positioned in a continuous array on an optical field 126 of a color contrasting with that of the outer surface 128 of the cable 112. In this form, enhanced optical readability may be provided.

Referring now to FIG. 9, a presently preferred manner of imprinting a particular cable 112 with a characteristic bar code is shown. For this purpose, an ink jet type imprinting system generally designated 130 is shown. This may comprise an ink jet printer and associated materials of the type commercially available and known as the Domino/Amjet non-contact Extrusion Marking System, available from the Gem Gravure Company, Inc., of West Hanover, Mass. This type of printer is capable of printing any desired code from any array of bar codes on cables with a high degree of speed and accuracy.

In FIG. 9, it is shown that there is a control console 132, which includes a keyboard module 134, which is able to receive an encoding sequence in a transmittable form for passage through the cable 136 into the memory contained in the cabinet 132. This keyboard may be the keyboard forming a part of the instrument shown, or may be the keyboard of a computer used to transmit and/or select code designations for the printer. This provides programming of the exact code that will be provided by the ink jet printing system 130 to the cable 112. When the code has been selected by proper coding in the module 134 and selected by the computer forming a part of the console 132, appropriate signals may be transmitted through the ink jet printer control cable 138, which is connected at its remote end to the printer module 140.

As shown, the cable 112 passes through a plurality of guide rollers 142 which are journaled for movement relative to a stand 144 located on a pedestal 146. A supply of cable (not shown) may be received on a conventional storage reel or the like. After passing through the guide roller unit, the cable passes through additional making head support assembly 148, relative to which the ink jet printer 140 may be positioned by the support arm 150. A signal is generated by the unit 148, indicating the passage of a selected length of cable therethrough; the ink jet printer 140 is then enabled, and a characteristic bar code pattern consisting of bars and spaces 120, 122, and 124 is imprinted at spaced apart points along the length of the cable 112, on the optical field 126. The code thus imprinted may include the identity code only, or part or all of the location code, and one or more auxiliary codes as well.

Referring now to a presently preferred form of practicing the invention, FIG. 10 shows a bar code 118 printed on an optical field 126 appearing on the outer surface of a cable 112 in the process of being read by a "gun" generally designated 150. The gun 150 is shown to have a handle 152 adapted to be grasped by the operator. When a trigger 154 is depressed, a laser light beam 156 is emitted from the nose portion 158 of the gun and is used to scan and read the bar code 118 on the cable 112. In this form of practicing the invention, the gun 150 will associate in its memory of location records the particular record associated with the particular coded cable 112.

Upon proper "request", the various points comprising the location record, which include the various way points, origin point, and termination point of the cable 112, will appear in a desired sequence in the display window 160. Guns such as the gun 150 are commercially available in a form wherein a series of successive displays of information may be made in sequence until all of the elements in the particular location record have been recalled and displayed. Alternatively, the memory may reside in a hand-held portable computer that may be addressed to secure location information.

Thus, were the cable to have been routed as shown in FIG. 7, and assuming such route or location record were disclosed either by the bar code shown in FIG. 8, or that such route or location record were placed in the gun memory and recallable through the code for association between the carrier element and the location record, then the gun (or other memory storage device) could be actuated to display the origin, destination, and all intermediate way point coordinates comprising the location record. Naturally, the records could be summoned in printed form if the records were stored in a computer with an associated printout mechanism.

Thus, wherever any part of the cable or carrier 112 could be found, its bar code can be scanned by the gun. This simple act will then uniquely identify the carrier and make available a record of whatever number of additional location points is desired to be determined within the building wherein the cable would be found.

In addition to the grid patterns such as those comprising a plurality of floors, and which are depicted generally in FIG. 7, the present invention may employ any coordinate system that can effectively describe unique locations within the rigid structure in which the cable system is used. It is therefore contemplated that use of the invention in structures such as ships, airplanes, or road-going vehicles may involve different types of grids, patterns, coordinate systems, etc. to identify uniquely the pathway each carrier is intended to follow.

Referring now to an example of such practice, it is customary for aircraft and large ships to include so-called station numbers forming discrete elements of length and used for reference in loading, center of gravity determination, and the like. These units may, in effect, be used as a part of the location grid where the structure is of the type that already includes such location designation within it. The various decks or the like within a ship, for example, may be used as some of the other elements forming a part of the characteristic location plan and record necessary to lay out wire, optical cables, air or vacuum power or signal carriers, hydraulic lines, fluidic signal carriers, or other power or signal carriers located within the ship.

In other respects, the invention is practiced in the same way, i.e., determining an intended carrier location, recording its location points to create a location point record, expressing or identifying either the carrier's unique identity or the location points in a code, associating the code with the carrier, installing the carrier according to the location plan, and retaining access to the location record by means of the code to assist in subsequent retrieval and/or analysis of the carrier. The code may, but need not, include separate identity and location terms if this is desired and circumstances permit.

Referring now to other uses of the invention, a building or other rigid physical structure is normally the site in which the invention is used, and in this sense, the term "rigid structure" is intended to refer to any physical structure wherein characteristic parts have determinable individual locations, even if the locations may move relative to each other during portions of the operation of the structure. This includes, for example, relatively movable structural parts such as elevators, the cabs of cranes or power shovels, gun turrets, and the like.

Referring now to another anticipated application of the invention, it is becoming increasingly common in automotive technology to provide engine diagnosis by computer. In this connection, the electrical system of an automobile may include a multi-channel or like plug or access port for attachment of diagnostic equipment. The mechanic dealing with the auto for trouble-shooting or repair purposes associates the plug with a preprogrammed diagnostic computer, which contains a program or test sequence appropriate for the particular make and model of car. The program is selected and the test sequence is performed so that a comparison may be made between the values detected and the proper values for such test sequence. Such practice may normally, as by checking electrical properties, locate a flaw in the operation of the automobile and indicate which parts should be repaired or replaced.

In automotive wiring, including wiring in autos having such "diagnostic plug" outlets, it is customary to encode wires with a characteristic color code and then enclose the wires in a so-called wiring harness arrangement. In this way, dozens, if not hundreds, of wires, each having a characteristic, potentially identifiable terminal, are routed to chosen locations throughout the automobile and affixed, as by fittings or to the terminals of instruments, lights, or source points for electrical signals taken directly or transduced from a signal source. However, the pathway of wires having two visible ends may be obscured, because a lengthy intermediate area of the wire is usually encased in an opaque sheath or harness. Moreover, a very limited number of color codes are available and, with use, these codes tend to change in color, and become darker and generally less visible to the mechanic or trouble-shooter.

Moreover, a certain percentage of workers may be totally or partially color blind, rendering the analysis-by-color code method disadvantageous. Still further, a number of individual conductors are often associated with a common conductor bus, and hence many wires may be spliced at invisible locations within an opaque wiring harness.

Even as to wires which are not enclosed within a harness, these may be situated within inaccessible parts of the automotive substructure. This prior art system of wire management has limited the ease of automotive trouble shooting, replacement, and repair. According to the present invention, it is possible to assign accurate intended locations to individual wires, record these locations, encode the wires, and using a hand held or other form of fixed or portable bar code reader, for example, to scan the wires so as to determine not only what the conductor is, for example, but what characteristic current or voltage trace should be found within it for diagnostic purposes. Needless to say, continuity checks are greatly facilitated by locating the wires in this manner. Using the invention to identify wires within the overall electrical bundle or wires that sheath a number of conductors can also make wire location easier.

In other words, the harness may be constructed of a plurality of codeable sheaths, whereby the location of the individual wires within a sheath may be recorded and determined. In the case of color-coded wires being encased within a wiring harness, this would not be possible because, even if located, the characteristic color would be concealed from the view of the mechanic.

According to the invention, therefore, it is possible to locate, for trouble-shooting purposes, including the attachment of electrical probes, individual wires whose colors might otherwise be invisible or not inherently distinctive. The potential for matching particular parts of the tune-up or diagnostic code visible to the mechanic on a CRT display associated with his diagnostic computer with individual carriers or conductors could thus be enhanced, and this could greatly simplify automotive and like vehicle maintenance and repair.

Figure 11:
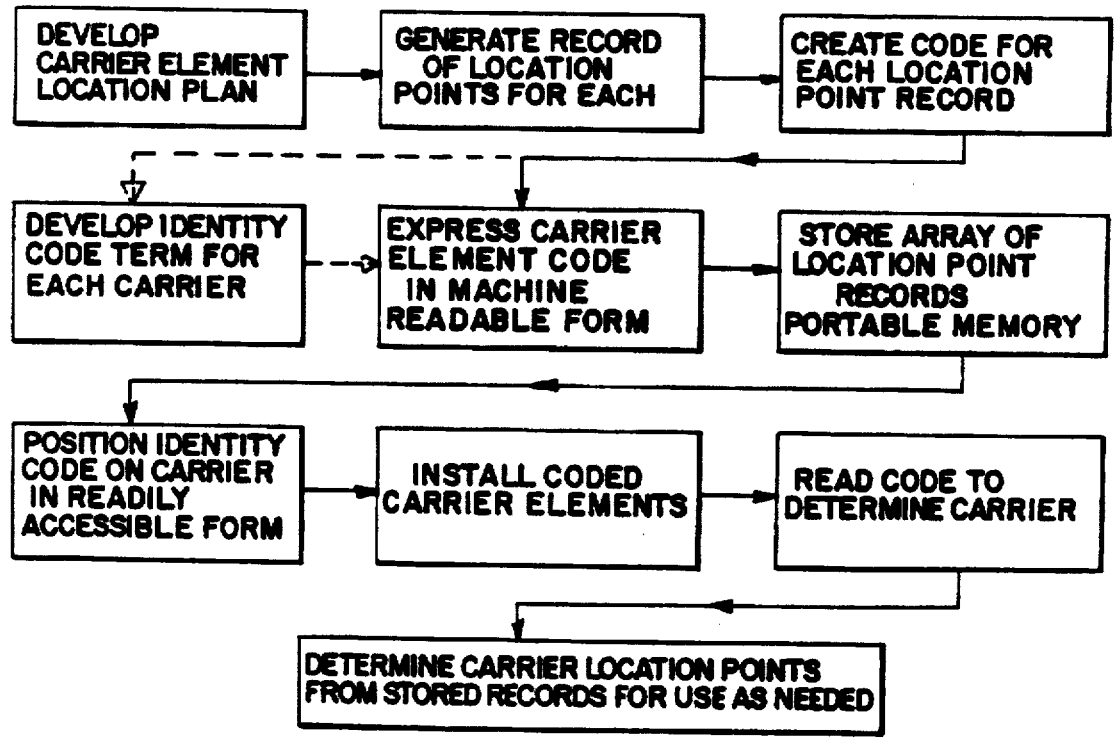
FIG. 11 is a block diagram illustrating a modified form of the method of the invention.

Referring now to FIG. 11, a block diagram is shown that in some respects is believed to be self-explanatory. This diagram generally resembles the first block diagram of FIG. 6, but differs therefrom in detail.

In particular, in FIG. 11, there is shown a first box indicating that the first step in the process is the development of a location plan for all of the carrier elements. It is indicated that a record of the location plan should be made, i.e., a record is prepared showing, for each carrier element, the location of a number of points along the path intended to be followed by the carrier element. This record has sufficient points at least to indicate, for example, the origin and destination of the carrier, and where it changes direction, level, or the like, from time to time along its path. Collectively, all these points form what may be termed the "carrier element locus".

According to the block diagram, the next phase is to create a separate code for each location point record, with each code having whatever number of terms, at the minimum, are necessary to enable reference to be made to one unique record within the array of records comprising the location plans for all the carrier elements in the entire building. In other words, the code for each carrier should be unique, and it should, expressly or implicitly, contain a term or other means to correlate it with its associated location plan. Whether or not this is done with a correlation table per se is unimportant. As long as the carrier element code can be correlated, uniquely and accurately, with a location point record, the method of the invention may be practiced. As pointed out above, the code itself might contain a term indicative of every significant point comprising the location plan, or may merely include enough terms so that the code may be distinguishable from codes applicable to other carrier elements. On the other hand, the code may be totally arbitrary, and serve only the correlation function. In any case, a location record for each carrier element is prepared and maintained permanently.

The fourth block in FIG. 11 shows an optional step, that of developing further code terms, if these are needed to identify or correlate with the carrier element. This would not normally be required, but in those cases where plural different carrier elements follow parallel paths, and where the codes are descriptive of the element locus rather than arbitrary, such carrier elements should have codes permitting them to be distinguished from one another. In such case, a separate or auxiliary term may be necessary to be certain that there is a completely unique designation of each particular carrier element, i.e., correlation between the carrier element code and its location plan.

Whether or not this optional step is used, the next customary step, as indicated in the block diagram, is to express the carrier element code in machine readable form. While the requirement of machine-readability is not necessary to the generic practice of the invention, in the preferred form the carrier element code is express as an optically machine readable code, e.g., a bar-code. The next step shown is to store in a portable memory the array of various location records theretofore generated. While the memory need not be portable for purposes of generic practice of the invention, when the invention is practiced in the form shown in FIG. 10, i.e., wherein the memory is portable, then this step adds convenience and is a preferred step in practicing the invention.

The next step shown is the "association", i.e., imprinting the code on or affixing it to the carrier. As pointed out above, the code is usually imprinted in an optically visible form, but might be embodied in a magnetic or other suitable form. As pointed out, the code should be reproduced at intervals along the length of the carrier so that ready access may be had to the code from any part of the carrier.

As shown, the next step simply comprises installing the precoded carrier elements within the structure according to the prior general location plan.

The next step shown in FIG. 11 assumes that a certain amount of time has elapsed and it is necessary to utilize the advantages of the system by locating or trouble-shooting a particular carrier element. Here, the step shown is to determine the identity of the carrier by use of the code. As shown in FIG. 10, this simply involves scanning the bar-code with the gun to determine which particular carrier is being addressed.

The last step shown in FIG. 11 is that of machine-reading the code and displaying the location record information applicable to that carrier element adjacent the code reading site for use as needed. In this sense, the code is actually correlated with the location plan or locus record, and it is the record of points that is able to be read. This diagram actually shows a result more than a step, insofar as it illustrates the capability of the gun 150 to perform the reading, correlating, and display functions so that a carrier may be identified from any point along its particular locus or path, which locus was in turn disclosed for the purposes referred to herein.

Most generically, therefore, the practice of the invention may be summarized as (1) developing a location plan for plural carriers, each having an individual locus, (2) making a record of all individual loci and storing these in a location plan record, (3) generating a code that may be associated with each carrier element whereby each element may be uniquely correlated with the location plan or locus of each carrier element, (4) repeatedly expressing the code, as by printing or labeling for example, at various points along the length of the carrier element, and (5) installing the carrier elements according to the individual location plans, whereby the carrier elements permit disclosure of the identity of the element and its entire locus, and whereby reference to the location plan will disclose the whereabouts of the carrier elements within the structure.

In the foregoing and other examples, reference has been made principally to optical and electrical conductors as "signal carriers" or merely "carriers." As pointed out above, this is the generic term used herein and in the claim to cover all the forms of carriers referred to above, and others as well.

It will thus be seen that the present invention provides novel methods and apparatus for installing conductor cables in rigid building structures, which have a number of advantages and characteristics, including those pointed out herein and others which are inherent in the invention. Preferred methods and apparatus having been shown by way of example, it is anticipated that modifications and variations to the described form of the invention will occur to those skilled in the art, and it is anticipated that such variations or modifications may be made without departing from the spirit of the invention or the scope of the appended claims.

I claim:

1. A method of identifying a plurality of carrier elements and emplacing said plurality of carrier elements within a building structure so that each of said elements follows a given path within said building structure, said method including the steps of determining the given path of one of said carrier elements is to follow when installed within said building structure, said path including an initial location point at which one end of said one carrier element is disposed, a final location point at which another end of said one carrier element is disposed, and a series of intermediate location points lying within said building structure and between said ends of said one carrier element, creating a retrievable record of said location points, associating said retrievable record of said location points with a unique expression identifying said one carrier element, placing said retrievable record of location points within a computer memory such that said record is identifiable using said unique expression, placing plural iterations of said unique expression in detectable form at spaced apart points on said one of said carrier elements, whereby said one of said carrier elements bears plural iterations of said unique expression, repeating, for each of the remainder of said plurality of carrier elements, said steps of determining a path in terms of said location points, creating a retrievable record of said location points, associating said record with a unique expression identifying said carrier element placing said record of location points within said computer memory such that said record is identifiable using said expression, and placing said plural iterations of said unique expression in detectable form at spaced apart points on said carrier element, and thereafter causing each of said plurality of carrier elements to be installed within said building structure along said determined path for each carrier element, thereby creating a building structure with a network of installed carriers, the location of all parts of each of which is determined by using said unique expression to identify a portion of said computer memory containing said record of location points.

2. A method as defined in claim 1 wherein said carrier elements are elements for carrying signals.

3. A method as defined in claim 1 wherein said carrier elements are electrical conductors.

4. A method as defined in claim 1 wherein said carrier elements are fiber optic conductors.

5. A method as defined in claim 1 wherein said carrier elements are conductors for pneumatically transmitted signals.

6. A method as defined in claim 1 wherein said carrier elements are fluid-carrying lines.

7. A method as defined in claim 1 wherein said record of location points for each of said carriers includes terms indicating that said paths are three-dimensional paths.

8. A method as defined in claim 1 wherein said carrier elements carry electrical or electronic signals from plural sources, said method further including causing said unique expression to additionally include a term identifying the signals contained in said carrier elements.

9. A method as defined in claim 1 wherein said unique expression is an expression in optically readable form.

10. A method as defined in claim 1 wherein said unique expression is an expression in bar code form.

11. A method as defined in claim 1 wherein the path of each of said carrier elements is a substantially planar path within said building structure.

12. A method as defined in claim 1 wherein said building structure is a multi-story structure and wherein at least of some of said paths followed by said carrier elements include portions on different levels of said multi-story building.

13. A method as defined in claim 1 wherein said step of placing plural iterations of said unique expression in a detectable form on a carrier element comprises placing plural iterations of a bar code expression on a portion of said carrier element in areas of said carrier element containing a background contrasting with said bar code.

14. A method as defined in claim 1 wherein said step of placing said plural iterations of said unique expression on said carrier element comprises affixing plural pieces of a magnetically sensitive tape to said carrier element.

15. A method as defined in claim 1 wherein said step of causing said carrier elements to be installed along said given paths includes determining at least one location point on said carrier element by reference to said retrievable record in said computer memory.

16. A method of identifying a plurality of electrical signal carriers and emplacing each of said carriers along a given path within a building structure, said method including the steps of determining a given path one carrier is to follow when installed within said building structure, said path including an initial spatial coordinate point at which one end of said one carrier is disposed, a final spatial coordinate point at which another end of said one carrier is disposed, and a series of intermediate spatial coordinate points lying within said building structure and between said ends of said one carrier, arranging said spatial coordinate points in a retrievable record, identifying said retrievable record of said spatial coordinate points by a particular expression in bar code form, said expression also identifying said one carrier element, placing said retrievable record of spatial coordinate points in look-up table form within a computer memory such that said record is retrievable using said particular expression, repeating, for each of the remainder of said plurality of carriers, said steps of determining a given path in terms of said spatial coordinate points, associating said bar code expression with said given carrier and placing said look-up table of spatial coordinate points into said computer memory such that said look-up table is retrievable using said expression, placing plural iterations of said particular expression in bar code form on each of said remainder of said carriers at spaced apart points on each of said remainder of said carriers, whereby each of said plurality of carriers bears a plurality of said bar code expressions, and thereafter causing each of said plurality of carriers to be installed within said building structure along said path determined for each carrier, thereby creating a building structure with a network of installed carriers, said spatial coordinate points of all parts of each carrier being able to be determined by using said bar code expression to look up said points within said look-up table form within said computer memory.

17. A method of identifying and emplacing carrier elements within a structure, said method including the steps of developing a location plan of a plurality of carrier elements, at least some of which will be disposed at locations that differ in part from the location of other carrier elements within said structure, generating a record of location points at which each carrier element will be located, whereby each carrier element has an individual location point record, creating a code of each of said location point records, thereby creating a plurality of location point codes each of which is different from any other location point code in at least some respects, expressing and storing an array of said location point records in memory means permitting subsequent access, associating a particular location point code with each of said carrier elements so that said code is in readily accessible form at plural spaced apart points on said carrier element, installing said carrier elements identified by said code according to said previously developed carrier element location plan, whereby each said carrier element is identifiable by reference to said location point code and whereby all location points of any one of said carrier elements is determinable when needed for maintenance or repair or replacement of said carrier element.

* * * * *